United States Patent [19]
Pertsov et al.

[11] Patent Number: 5,470,460
[45] Date of Patent: Nov. 28, 1995

[54] APPARATUS FOR THE PURIFICATION OF CYANIDE-CONTAINING WASTE WATER

[75] Inventors: Nikolay V. Pertsov, Moscow; Zoya R. Ulberg; Vladimir E. Vember, both of Kiev; Valentina I. Podolskaya, Kiev; Boris S. Kogan; Eduard K. Burenkov, both of Moscow, all of Russian Federation

[73] Assignee: 958075 Ontario Inc., Toronto, Canada

[21] Appl. No.: 290,944

[22] PCT Filed: Feb. 24, 1993

[86] PCT No.: PCT/CA93/00077

§ 371 Date: Nov. 28, 1994

§ 102(e) Date: Nov. 28, 1994

[87] PCT Pub. No.: WO93/16962

PCT Pub. Date: Sep. 2, 1993

[30] Foreign Application Priority Data

Feb. 25, 1992 [RU] Russian Federation ............... 5036319

[51] Int. Cl.⁶ .................................................... C02F 3/02
[52] U.S. Cl. ........................ 210/151; 210/202; 210/259; 210/266; 210/280; 211/616; 211/631; 211/904
[58] Field of Search ................................... 210/150, 151, 210/202, 220, 258, 259, 262, 266, 280, 616, 620, 631, 904

[56] References Cited

U.S. PATENT DOCUMENTS

| | | | |
|---|---|---|---|
| 4,168,228 | 9/1979 | Mallatt et al. | 210/631 |
| 4,292,176 | 9/1981 | Grutsch et al. | 210/616 |
| 4,407,717 | 10/1983 | Teletzko et al. | 210/151 |
| 4,500,429 | 2/1985 | Reimann et al. | 210/616 |
| 4,521,311 | 6/1985 | Fuchs et al. | 210/151 |
| 4,786,913 | 11/1988 | Reimann et al. | 210/616 |
| 4,897,196 | 1/1990 | Copa et al. | 210/616 |
| 4,919,815 | 4/1990 | Copa et al. | 210/616 |
| 5,126,050 | 6/1992 | Irvine et al. | 210/151 |

FOREIGN PATENT DOCUMENTS 847640  9/1960  United Kingdom.

OTHER PUBLICATIONS

Fundamental and Applied Biohydrometallurgy, pp. 327–339.

Derwent's abstract No. 85–11435/19, week 8519, ABSTRACT OF SU, A, 1116–022 (KOMM MINE METAL) 30 Sep. 1984 (30.09.84).

Derwent's abstract No. 89–148991/20, week 8920, ABSTRACT OF SU, A, 1414–790 (VECTOR COMMISSION WK), 7 Aug. 1988 (07.08.88).

*Primary Examiner*—Christopher Upton
*Attorney, Agent, or Firm*—D. Doak Horne; Arne I. Fors; Jeffrey T. Imai

[57] ABSTRACT

A two-stage apparatus for the purification of cyanide-containing waste water allows relatively clean water to be obtained from waste water containing high concentrations of cyanide and solids in suspension. The apparatus in its first stage includes a bioreactor having a biocultivator (27) for cultivating microorganisms. A reservoir means (1) in communication with the cultivator (27) is provided for receiving and treating a mixture of waste water and microorganisms, having a downwardly converging conical base. Oxygenating means (8) are provided in a region proximate the conical base, for supplying oxygen to the mixture. Temperature regulating means (7) and stirring means in the form of a stirrer or pump (6) are also provided. The second stage of the apparatus comprises a sorption chamber (28) in communication with the reservoir means, for containing an ion-exchange resin, activated carbon, charcoal, or other sorption material. Oxygenation means (31) and an airlift (32) for stirring the mixture are provided in conjunction with the sorption chamber (28). Conduit means (33) are further provided to allow the mixture of sorption material and waste water at the second stage to be thrown onto an inclined straining screen (34), whereby said sorption material may roll down the screen back into chamber (28), while the cleansed water passes therethrough and may be collected.

11 Claims, 2 Drawing Sheets

APPARATUS FOR THE PURIFICATION OF CYANIDE-CONTAINING WASTE WATER

TECHNICAL FIELD OF INVENTION

The invention relates to an apparatus for the purification of industrial waste water, and more particularly to an improve bioreactor apparatus configuration for purifying cyanide-containing waste water.

BACKGROUND ART

Cyanide-containing waste water formed after the cyanization stage of the gold-refining process, as well as in some galvanic processes such as electroplating, besides possessing free cyanides, further contains cyanide complexes such as thiocyanates and other heavy metals which pollute waste water and thus negatively affect the environment. Accordingly, the need for purification of cyanide-containing waste water is extremely urgent.

The use of microorganisms for the purification of this waste water allows use of an ecologically pure process to clean cyanide-containing waste water. The known apparatus for the purification of cyanide-containing waste water utilizing microorganisms includes a bioreactor with immersed stirring units consisting of 48 discs of 3.6 m in diameter, on which microorganisms are placed (Fundam. and Appl. Biohydrament Proc. 6 Int. Symp. Biohydramet. Vancouver, Aug. 21–29, 1985, Amsterdam, e.a. 1986, 327–329). The discs with the microorganisms thereon are rotated with a velocity of 0.5–1.6 rpm so as to simultaneously stir and cause contact between the microorganisms and cyanide-containing waste water. The microorganisms (bacteria) gradually separate from the discs and fall down to the bottom of the bioreactor. The precipitate consisting of worked-out cells of the bacteria with the sorbed metals, including cyanide, is removed from the effluent by filtration. This process may only be utilized for cyanide-containing waste water having about 6.5 mg/l of cyanides and about 7.8 mg/l of solid phase (suspended solids). In addition, the apparatus designed to carry out such process is only able to accomplish this task over the duration of about 1 week.

FIG. 2 of GB-A-847,640 discloses inter alia an apparatus (treatment plant) for successively removing in stages firstly phenols, then cyanides, and then ammonia, from waste waters using microorganisms. The stage for removing cyanides comprises firstly putting the cyanide-containing effluent into a settling tank 9, and subsequently passing the effluent to an microorganism inoculated percolating filter 14, or series of filters. The filter 14 consists of a bed of aggregate such as graded coke or cinders held in place by a retaining wall and supported in such a manner as to permit the flow of air to the bacteria through the interstices of the bed by natural ventilation. Means of distributing the liquor uniformly over the filter cross-section is provided by a rotary distributor circling the bed, operating at two revolutions per minute. The inoculation of the filter 14 is carried out by treating the aggregate with the microbiological inoculum, and spreading it over the surface of the filter, thereby forming the filter bed. Significantly, the microbiological treatment takes place in a single stage by spraying the liquid effluent onto microorganism-inoculated bed. Under these conditions a period of about one to three weeks is required for the maximum thiosulphate, thiocyanate and cyanide conversion to take place.

The present apparatus, however, due to advantages inherent in its configuration, can be used for cleaning cyanide-containing waste water with much higher initial content of both cyanides and suspended solids. In addition, the required cleaning can be accomplished in a short time.

BRIEF SUMMARY AND OBJECTS OF THE INVENTION

Accordingly, an object of this invention is to provide an improved apparatus to clean cyanide-containing waste water.

A further object of this invention is to provide an improved apparatus which maximizes the ability of microorganisms to break down and/or remove cyanide and cyanide complexes from waste water.

A still further object of the invention is to provide an apparatus which allows use of an electric field to assist microorganisms in their ability to remove and break down cyanide and cyanide-containing complexes.

Accordingly, in one embodiment of the invention, there is provided a two-stage apparatus for cleaning of waste water containing suspended solids and cyanide in a dissolved state, comprising:

a first stage comprising a bioreactor, having:
  (i) at least one cultivator means for cultivating microorganisms;
  (ii) reservoir means for receiving and treating a mixture of said waste water and micro-organisms, having a downwardly converging conical base;
  (iii) oxygenating means for supplying oxygen to said mixture in a region proximate said conical base;
  (iv) temperature regulating means for maintaining said mixture at a constant temperature;
  (v) stirring means for stirring said mixture; and a second stage for receiving contents of said bioreactor, comprising:
  (i) a sorption chamber in communication with an outlet from said reservoir means, having a substantially downwardly-converging conical base, for containing an ion-exchange resin, activated carbon, charcoal, coke, or other sorption material mixed in suspension with said mixture;
  (ii) oxygenating means for supplying oxygen to said contents of said sorption chamber;
  (iii) stirring means for stirring the contents of said sorption chamber;
  (iv) straining means for separating said suspended sorption material from the waste water after treatment in said sorption chamber; and
  (v) conduit means to allow said contents of said sorption chamber to be thrown onto said straining means and the sorption material separated therefrom.

Advantageously, the above configuration allows for treatment of waste water containing relatively high concentrations of dispersed suspended solids and cyanide concentrations. The utilization of waste water having suspended solids therein in the first stage of treatment is used to advantage in that it allows cyanide-specific microorganisms when simultaneously supplied with oxygen, to use such suspended solids as sites for the break down of cyanide and cyanide complexes.

In a further refinement, the bioreactor of the present invention may be divided by vertical partitions into at least three sections, each section having orifices through which a successive overflow of treated cyanide-containing waste water may flow, each of said sections possessing:

(i) reservoir means, having a substantially downwardly-converging conical base, for receiving and treating a mixture of said waste water and microorganisms;

(ii) oxygenating means for supplying oxygen to said mixture in a region proximate said conical base;

(iii) temperature regulating means for maintaining said mixture at a constant temperature; and (iv) stirring means for stirring said mixture.

The aforementioned modification allows for successive treatment of the waste water in the first stage, and the resultant increased intensification of the microbiological purification process via each successive bioreactor stage, culminating with the second stage treatment in the sorption chamber. Such modification allows continuous treatment of cyanide-containing waste water, rather than individual batch treatment, and further allows treatment of waste water with relatively high cyanide concentrations and suspended solids in a dispersed phase.

In a still further preferred embodiment, one or more of the sections within the bioreactor possess electrode means for creating an electrical field within such bioreactor during the reaction of the cyanide-containing waste water with the microorganisms. It has been found that employment of electrodes within the mixture to create an electrical field therein enhances the ability of the microorganisms to remove or breakdown cyanide contained in such waste water, particularly in instances where solid particles are in suspension within the waste water.

It is recommended that the downwardly-converging conical base of each of the reservoir means, and the sorption chamber, each have proximate the apex thereof an outlet means to allow periodic discharge of contents of the bioreactor and the sorption chamber. In the preferred embodiment a simple plug covers the orifice until draining of the reservoir or sorption chamber is desired, at which point the plug may be removed.

It is preferred that the straining means be a straining screen located substantially above the sorption chamber and inclined 20°–40° to the horizontal, and further that pump means be provided to pump the mixture within the sorption chamber, including any suspended particles therein, onto the screen wherein any suspended sorption particles and/or suspended solids slide off said screen and back into the sorption chamber, while the purified waste water passes through the screen and is then carried away.

The stirring means in the bioreactor and/or sorption chamber is preferably an airlift or pump for circulating the mixture therewithin from a lower region to an upper region. This effectively transports oxygen from lower regions to upper regions, thereby ensuring effective supply of oxygen to all regions of the bioreactor and/or sorption chamber. This modification permits optimum stirring and reduces the formation of suspended particle deposit at the bottom of each reservoir or sorption chamber during the continuous cleaning process.

DETAILED DESCRIPTION OF THE PREFERRED EMBODIMENTS

The apparatus for the cyanide-containing waste water purification (FIG. 1) includes a first stage comprising a bioreactor, the bioreactor comprising inter alia a cultivator means 27 for cultivating microorganisms.

Figure 1:
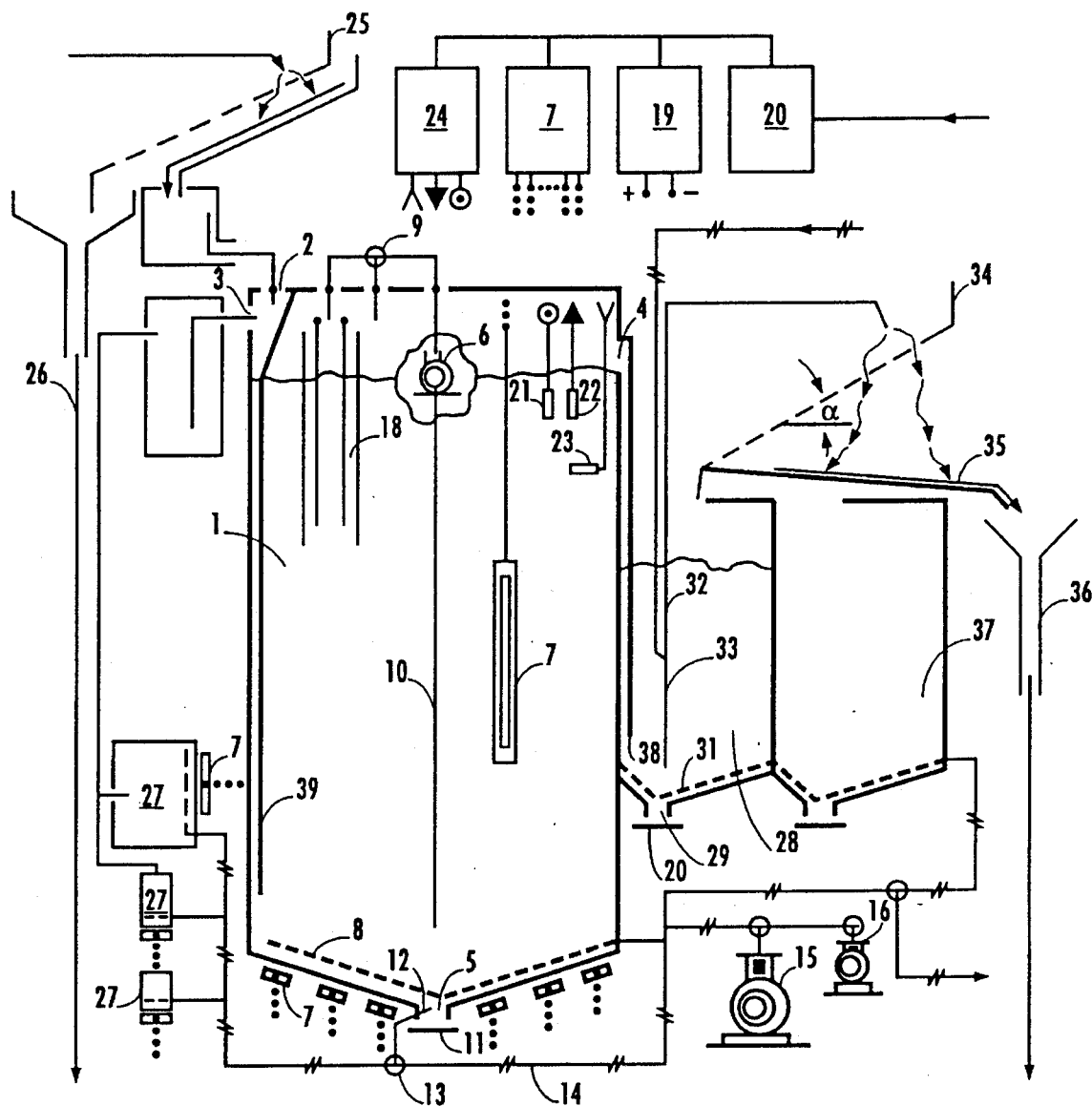
FIG. 1 shows a schematic representation of a first embodiment of the two-stage apparatus of the present invention.

In a preferred embodiment the cultivator 27 is comprised of three sections, of capacity five, twenty, and three hundred liters. A temperature control means 7 for the cultivator 27 of the microorganisms is provided, as shown in FIG. 1.

The bioreactor further comprises reservoir means in the form of cylindrical tank 1 with into the inlet 2 to allow supply of cyanide-containing water, the tank 1 having a further inlet 3 to allow supply microorganisms to the tank 1 and an outlet 4 to allow discharge the mixture of cyanide-containing waste water and microorganisms to a sorption chamber 28.

Notably, the tank 1 possesses a downwardly-converging conical base, having an outlet 5 proximate the lowermost apex thereof to permit renewal of sedimentary deposits from tank 1. A plug 12 is normally provided to keep the outlet 5 closed, which may be removed upon opening of damper 11. In a preferred embodiment the plug 12 is pneumo-destructive, meaning that an air-supply system 14 connected with main pump 15 and additional pump 16 may, when valve 13 is opened, provide air to pneumatically remove plug 12.

Said tank 1 is further provided with oxygenating means in the form of bubblers 8 located proximate the conical base for supplying oxygen to the mixture. The bubblers 8 comprise one or more porous pipes installed along the conical base of the tank, and connected to air-supply system 14.

Tank 1 is further provided with temperature regulating means. In the preferred embodiment the temperature regulating means is a heating element 7, which allows the mixture of waste water and microorganisms to be maintained at constant temperature. The heating element 7 may be of the automatic type which may be placed inside or outside the tank 1, or simultaneously inside and outside the tank for more complete temperature regulation, as shown in FIG. 1.

The tank 1 is further provided with stirring means for stirring the mixture. In a preferred embodiment the stirring means for the tank 1 comprises an impeller pump, connected to a vertical pipe 10, which draws oxygenated mixture from the lower region of the tank 1 and brings it to the top of the tank 1. In an alternative embodiment, the stirring means may be an airlift 32. The airlift 32 utilizes pressurized air introduced into a pipe 33 to raise mixture from a lower region of a tank to an upper region, while simultaneously oxygenating the mixture.

The second stage of the two-stage cleaning apparatus of the present invention comprises a sorption chamber 28 in communication with tank 1. The sorption chamber is provided for the purposes of containing an ion-exchange resin, activated carbon, charcoal, coke or other sorption material to further allow the microorganisms to break down and remove cyanide from the waste water. Like tank 1, sorption chamber 28 possesses a substantially downwardly converging conical base, having outlet 29 fitted with a damper 30 to allow discharge of the contents of sorption chamber 28 when desired. Oxygenating means, in the form of bubblers 31 are provided, preferably located proximate said conical base of said sorption chamber 28, for supplying oxygen to the mixture in the sorption chamber. Bubblers 31 are connected by means of airline-pipe 14 with main pump 15 and additional pump 16. Sorption chamber 28 is in communication with tank 1 via line 4. Stirring means, in the form of an airlift 32 to which vertical pipe 33 is joined, is provided. Straining means, in the form of a drainage screen 34 is further provided, located substantially above the sorption chamber 28 and inclined at an angle of 20°–40° to the horizontal. Holes in drainage screen 34 are of such size as to not permit any sorbing substance to pass through, but due to the incline of the screen they may slide or roll off screen 34 back into chamber 28. In operation, the airlift 32 continuously pumps the contents of the sorption chamber 28, including any suspended sorption particles, onto screen 34, whereby any sorption and/or suspended particles slide off screen 34 back into sorption chamber 28. Cleansed waste water, on the other hand, passes through screen 34, where it falls onto and is collected by one-piece sheet 35 and diverted into collector pipe 36, and thence to a storehouse.

In a preferred embodiment of the apparatus of the present invention, electrodes 18 are provided within tank 1, and are connected to a source of DC current, which is obtained from rectifiers 19, which are in turn connected to a power source 20. Electrodes 18, when supplied with electric current, provide an electric field within tank 1, which is of assistance to the microorganisms in allowing them to be attracted to and utilize as reaction sites the suspended particles in the waste water, thereby assisting in allowing them break down or remove cyanide contaminants.

The bioreactor of the present invention in tank 1 also possesses pH monitors 21, temperature monitors 22, and liquid level monitors 23. The output of these monitors 21, 22, 23 is directed to block 24, where the output is transformed into a digital or analog display. A screen 25 is provided over the inlet for the treated cyanide-containing waste water feed of tank 1. Screen 25 separates coarse sand particles from cyanide-containing waste water. After this separation the water contains suspended particles not exceeding 0.4 mm. Screen 25 is installed so as to direct the coarse particles into canal 26, while allowing passage therethrough of the cyanide-containing effluent and smaller suspended particles through passage 2 into the bioreactor tank 1.

Said tank 1 is connected through inlet 3 to at least with one cultivator 27 of microorganisms, and through outlet 4 to at least one sorption chamber 28.

In sorption chamber 28 pipe 38 can be installed vertically. In this case, the aperture of pipe 38 must coincide with outlet 4 in tank 1 of the bioreactor. This provides additional stirring of the mixture consisting of the cyanide-containing waste water and microorganisms. In the same way it is possible to provide additional stirring in tank 1 via pipe 39. For this purpose, pipe 39 is installed vertically in tank 1 of the bioreactor in such way that inlets 2 and 3 must coincide with the aperture of pipe 39.

Figure 2:
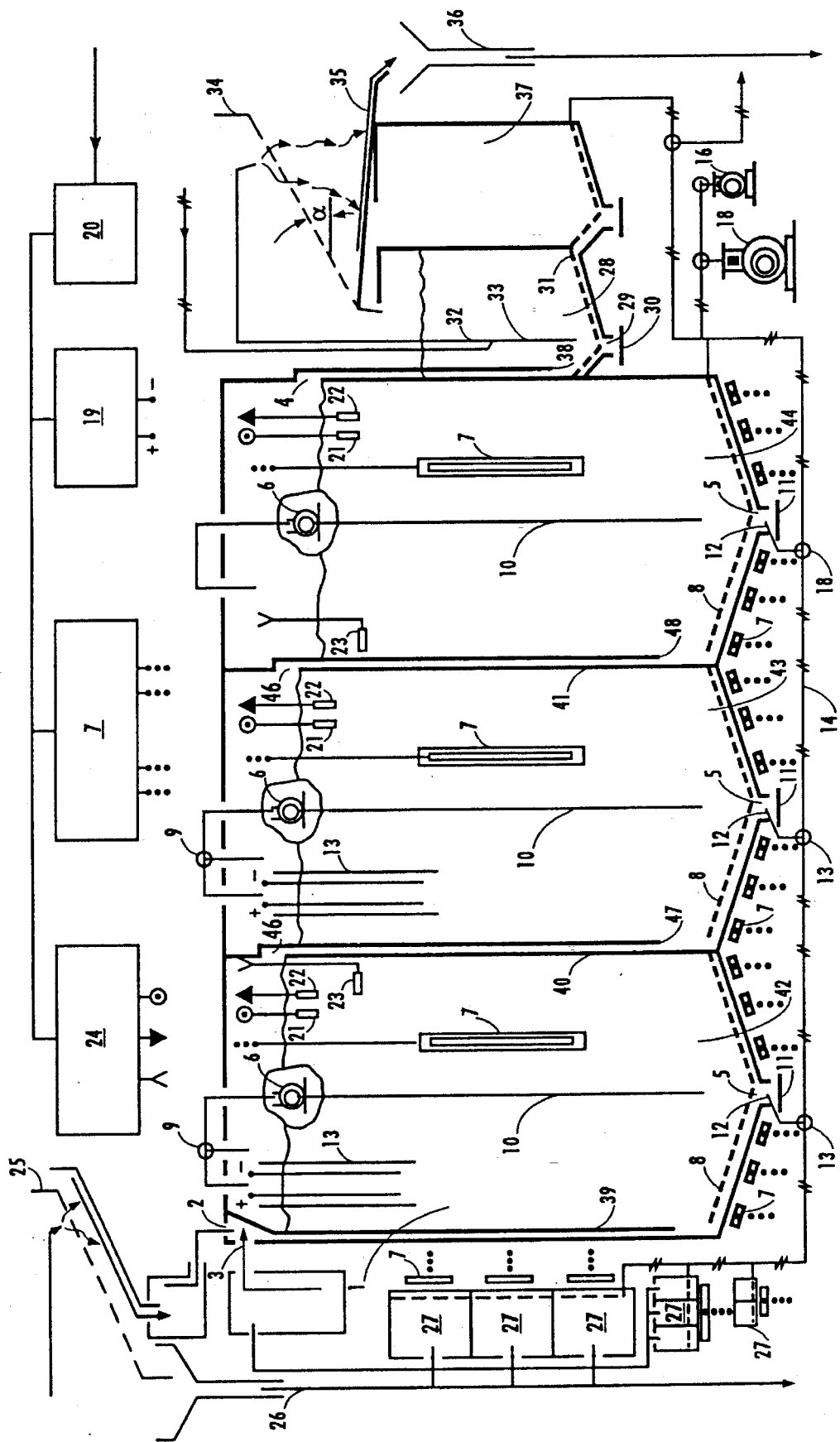
FIG. 2 shows a schematic representation of a further modification of the two-stage apparatus of the present invention, for continuous treatment of cyanide-containing effluent waste water.

In a further preferred embodiment of the apparatus of the present invention shown in FIG. 2, tank 1 is separated by vertical partitions 40 and 41 into three sections 42, 43, 44. Each section is equipped with heating elements 7, stirring units 6 and bubblers 8. The bottom of each section is a cone-like surface in the middle of which there is outlet 5 through which the contents of a section may be removed. Outlet 5 in every section is normally kept closed by damper 11, and is fitted with a sludge plug 12, which may be pneumatically removed by virtu of it being connected to a valve 13 and air-supply system 14. On the bottom conical surface of each section 42, 43, 44 bubblers 8 are installed. In upper part of partitions 40 and 42 there are holes 45 and 46 through which the mixture of cyanide-containing waste water and microorganisms by gravity from section 42 finds their way into section 43 and 44 respectively. Immediately adjacent to said partitions 40 and 41 pipes 47 and 48 can be mounted. Hole 45 in partition 40 is in communication with the upper aperture in pipe 47, and hole 46 in partition 41 communicates with the upper aperture in pipe 48. It is preferred that in at least in two sections 42, 43 electrodes 18 be mounted for the purpose of creating an electric field. Purified waste water is drawn off via canal 36.

The apparatus for the treatment of the cyanide-containing waste water operates in the following manner. First, a culture of microorganisms is grown. The cultivation is carried out in microorganism cultivator 27 by successive seedings from smaller vessels into bigger ones. To grow microorganisms a synthetic nutrient medium with the addition of glucose is used. The temperature for intensive cultivation is maintained at 27° to 30° C. The grown microorganism culture is fed into tank 1 of the bioreactor through inlet 3. The cyanide-containing waste water with suspended solid concentrations or approximately 1 g/l is supplied onto screen 25 which separates coarse sand particles from the cyanide-containing waste water. After such straining step the suspended particles do not exceed 0.4 mm. in size. The coarse fraction is removed through canal 26 and the cyanide-containing waste water including remaining suspended particles is fed into tank 1 of the bioreactor via inlet 2. Accordingly, the microorganism culture enters tank 1 through inlet 3 and together with cyanide-containing waste water entering through inlet 2 are together fed into the lower part of tank 1 of the bioreactor via pipe 39. During the apparatus start-up the cyanide-containing waste water preliminarily introduced into tank 1 also can be used for the microorganism growth.

With the help of heating element 7 a necessary temperature regime is controlled by heater 7 and temperature monitor 22. The pH control is performed by pH monitor 21. The measurements from temperature monitor 22 are transmitted to block 24 where the output is transformed into a digital or analog display, and used for the purpose of adjusting the temperature or pH of the bioreactor.

Importantly, air going through air pipeline 14 from pumps 15 and 16 via bubblers 8 in tank 1 provides saturation of the cyanide-containing waste water and microorganism mixture with oxygen, and maintains any particles therein in a suspended state, thereby preventing the formation of stagnation zones and avoiding creating over-concentrations of cyanide which result in local destruction of the microorganism culture medium. Impeller pump 6 performs also performs intensive stirring of the mentioned mixture, drawing mixture from the bottom of tank 1, and transporting it to the top of tank 1.

The biodestruction of cyanide also takes place during the passage of the cyanide-containing waste water and microorganisms through an electric field created by electrodes 18. In this case the opening of valve 9 causes impeller pump 6 to pump the treated cyanide-containing waste water from the lower portion of tank 1 along pipe 10 and supply it into the space between electrodes 18. After continuous cycles of treatment in the above manner, the cleansed mixture of the cyanide-containing waste water and microorganisms goes into sorption chamber 28 via outlet 4 in tank 1 via pipe 38. The final cleaning of the cyanide-containing waste water is carried out in sorption chamber 28 which contains a sorbing substance, such as for example, an ion-exchange resin, activated carbon granules, or other substances which have their exterior surfaces preliminary coated with one or more of the foregoing substances. In both the sorption chamber 28 and tank 1 the mixture of the cyanide-containing waste water and microorganisms is actively stirred and saturated by air supplied via bubblers 31. In the sorption chamber 28, however, the mixture of the cyanide-containing waste water and sorbing substance, for example, ion-exchange resin, is pumped through pipe 33 by airlift 32 onto drainage screen 34. Drainage screen 34 possesses an inclined surface inclined at an angle to the horizontal of $\alpha=20°-40°$ that allows ion-exchange resin or other sorbing substance roll off and to return to sorption chamber 28. The cleaned waste water passes through holes in the drainage screen 34 and falls onto sheet 35 and by gravity is directed to canal 36 from which it is carried off to a storehouse. Inasmuch as the apparatus for the cleaning of the cyanide-containing waste water is mainly intended to be used in a continuous process as opposed to a batch process, it is possible to use an additional sorption chamber 37 for the purposes of regenerating the sorbing substances, such as for example the ion-exchange resin utilized in sorption chamber 28.

The operation of the apparatus for the purification of cyanide-containing waste water having additional sections 42, 43, 44 in tank 1 is carried out similarly (FIG. 2). In this case, similarly to the process described for the apparatus shown in FIG. 1, the mixture of cyanide containing waste water and the microorganisms is supplied to section 42 in the manner previously described. Then said mixture by gravity goes to section 43 through hole 45 in upper part of partition 40 and pipe 47, and a new portion of cyanide-containing waste water enters section 42. In section 43 the treatment of the cyanide-containing waste water and microorganisms takes place in a similar manner to that previously described. Then this mixture goes to the lower part of section 44 through hole 46 in upper part of partition 41 via pipe 48. In section 44 the treatment above described is repeated. The cyanide-containing waste water and microorganism mixture is subsequently directed into sorption chamber 28. The treatment in sorption chamber 28 takes place as previously described.

The control of the process effectiveness is carried out by periodic sampling. In the case of a three-section tank of the bioreactor sampling is performed from the third section of the bioreactor and at the outlet 36 from the sorption chamber 28.

Table 1 shows the results of the chemical analysis of industrial wastes from Mordzhanhulak gold-mining factoring, such waste containing cyanides, thiocyanates, as well as various heavy metals including precious ones after decontamination. The mentioned Table gives the results of the chemical analysis of cyanide-containing waste water before and after treatment cited in "Fundam. and Appl. Biohydramet. Proc. 6 Int. Symp. Biohydramet Vancouver, Aug. 21–29, 1985, Amsterdam, e.a., 1986, 327–329.

TABLE 1

| INDICES | Cleaning of cyanide-containing waste water on the apparatus according to the present invention | | Cleaning of cyanide-containing waste water on the apparatus according to Fundam. and Appl. Biohydramet, 6 Int. Symp. Biohydramet Vancouver, Aug. 21–29, 985, Amsterdam, e.a. 1986, 327–329 | |
|---|---|---|---|---|
| Dispersity, g/l | 1.0 | | $7.8 \times 10^{-3}$ | |
| Cyanides, mg/l | 30.90 | not detected | 6.5 | 0.35 |
| Thiocyanates, mg/l | 50.40 | not detected | — | — |
| Zinc, mg/l | 5.20 | 1.30 | — | — |
| Iron, mg/l | 6.50 | 2.00 | — | — |

TABLE 1-continued

| INDICES | Cleaning of cyanide-containing waste water on the apparatus according to the present invention | | Cleaning of cyanide-containing waste water on the apparatus according to Fundam. and Appl. Biohydramet, 6 Int. Symp. Biohydramet Vancouver, Aug. 21–29, 985, Amsterdam, e.a. 1986, 327–329 | |
|---|---|---|---|---|
| Gold, mg/l | 0.20 | 0.03 | — | — |
| Silver, mg/l | 0.25 | 0.01 | — | — |

As may be seen from the given data the apparatus for the cleaning of the cyanide-containing waste water according to the invention allows purification of the cyanide-containing waste water with initial concentrations of suspended solids and cyanide content of 1 g/l and 30.9 mg/l respectively, whereas known apparatus in accordance with the method disclosed in Fundamental and Appl. Biohydramet. 6 Int. Symp. only cleanses cyanide-containing waste water having initial concentration of suspended solids and cyanide content of $7.8 \times 10^{-3}$ mg/l and 6.5 mg/l respectively. The proposed apparatus provides complete cleaning of waste water containing cyanides and thiocyanates, with simultaneous extraction of heavy metals including precious ones.

INDUSTRIAL APPLICATION

The apparatus for cleaning cyanide-containing waste water can be applied, for example, in gold-mining industry as well as in non-ferrous metallurgy to clean cyanides, thiocyanates and heavy metals including precious ones in high suspended-state concentrations from waste water.

Although the disclosure describes and illustrates preferred embodiments of the invention, many variations and modifications will now occur to those skilled in the art. For a full definition of the scope of the invention, reference is to be made to the appended claims.

We claim:

1. A two-stage apparatus for cleaning of waste water containing suspended solids and cyanide in a dissolved state, comprising:

a first stage comprising a bioreactor, having:
(i) at least one cultivator means (27) for cultivating micro-organisms;
(ii) reservoir means (1) for receiving and treating a mixture of said waste water and micro-organisms having a downwardly converging conical base;
(iii) oxygenating means (8) for supplying oxygen to said mixture in a region proximate said conical base;
(iv) temperature regulating means (7) for maintaining said mixture at a constant temperature;
(v) stirring means for stirring said mixture; and a second stage for receiving contents of said bioreactor, comprising:
(i) a sorption chamber (28) in communication with an outlet 4 from said reservoir means 1, having a substantially downwardly-converging conical base, for containing an ion-exchange resin, activated carbon, charcoal, coke, or other sorption material mixed in suspension with said mixture;
(ii) oxygenating means (31) for supplying oxygen to contents of said sorption chamber;
(iii) stirring means for stirring the contents of said sorption chamber;

(iv) straining means (34) for separating said suspended sorption material from the waste water after treatment in said sorption chamber; and (v) conduit means (33) to transport said contents of said sorption chamber to said straining means (34) and the sorption material separated therefrom.

2. The two-stage apparatus for cleaning of cyanide-containing waste water as claimed in claim 1, wherein said reservoir means further comprises electrode means for creating an electric field therewithin.

3. The two-stage apparatus for the cleaning of cyanide-containing waste water as claimed in claim 1, wherein one or more of said stirring means is a pump means (6) for circulating said mixture from a lower region of either of said reservoir means or sorption chamber to an upper region.

4. The two-stage apparatus for the cleaning of cyanide-containing waste water as claimed in claim 1, wherein one or more of said stirring means comprises airlift means (32) for circulating said mixture from a lower region of either of said reservoir means or sorption chamber to an upper region thereof while simultaneously oxygenating the mixture.

5. The two-stage apparatus for the cleaning of cyanide-containing waste water as claimed in claim 1, wherein:

said straining means is a straining screen (34) located substantially above said sorption chamber (28) and inclined to the horizontal at an angle of 20°–40°; and said conduit means (33) comprises pump means and associated piping to pump said contents of said sorption chamber, including any suspended sorption particles, via said piping onto said screen wherein said sorption and/or suspended solid particles slide off said screen (34) back into said sorption chamber (28), and said cleansed waste water passes through said screen (34) to a collection means.

6. The two-stage apparatus for the cleaning of cyanide-containing waste water as claimed in claim 1, wherein the downwardly-converging conical bases of each of said reservoir means and said sorption chamber have proximate the apex thereof an outlet means (5) to allow periodic discharge of contents of said bioreactor and said sorption chamber.

7. The two-stage apparatus for cleaning of cyanide-containing waste water as claimed in claim 1, wherein said bioreactor is divided by vertical partitions (40) and (41) into at least three sections (42), (43) and (44), each section having orifices (45), (46) and (4) respectively, through which a successive overflow of treated cyanide-containing waste water may flow, each of said sections possessing:

(i) reservoir means, having a substantially downwardly converging conical base, for receiving and treating a mixture of said waste water and microorganisms;

(ii) oxygenating means (8) for supplying oxygen to said mixture in a region proximate said conical base;

(iii) temperature regulating means (7) for maintaining said mixture at a constant temperature; and (iv) stirring means for stirring said mixture.

8. The two-stage apparatus for the cleaning of cyanide-containing waste water as claimed in claim 7, wherein at least two sections (42), (43) possess electrode means for creating an electric field therewithin.

9. The two-stage apparatus for the cleaning of cyanide-containing waste water as claimed in claim 7, wherein one or more of said stirring means is a pump means (6) for circulating said mixture from a lower region of either of said reservoir means or sorption chamber to an upper region.

10. The two-stage apparatus for the cleaning of cyanide-containing waste water as claimed in claim 7, wherein one or more of said stirring means comprises an airlift (32) for circulating said mixture from a lower region of either of said reservoir means or sorption chamber to an upper region while simultaneously oxygenating the mixture.

11. The two-stage apparatus for the cleaning of cyanide-containing waste water as claimed in claim 7, wherein the downwardly-converging conical bases of each of said reservoir means in each of said sections (42), (43) and (44) and said sorption chamber (28) have proximate the apex thereof an outlet means (5) to allow discharge of the contents thereof.

* * * * *